Patented Feb. 26, 1929.

1,703,504

UNITED STATES PATENT OFFICE.

GEORGE P. WALTON AND ROBERT F. GARDINER, OF WASHINGTON, DISTRICT OF COLUMBIA, DEDICATED BY ASSIGNMENT TO THE GOVERNMENT AND THE PEOPLE OF THE UNITED STATES OF AMERICA.

FERTILIZER MATERIAL AND PROCESS FOR MANUFACTURING THE SAME.

No Drawing.   Application filed July 19, 1927.   Serial No. 207,011.

(GRANTED UNDER THE ACT OF MARCH 3, 1883, AS AMENDED APRIL 30, 1928; 370 O. G. 757.)

This application is made under the act of March 3, 1883, chapter 143 (22 Stat. L. 625) and the invention herein described and claimed may be used by the Government of the United States or any of its officers or employees in the prosecution of work for the Government, or by any citizen of the United States, without payment to us of any royalty thereon.

This invention relates to simple composting processes for conserving and converting into valuable fertilizer materials, organic refuse such as offal and blood obtained from the slaughter of animals, wastes from fish and shell-fish industries, or household garbage. Other organic products, to the conservation of which the aforesaid composting processes are likewise applicable, are the moist tankages, or tankage press-cakes produced in the cooking, rendering, or reduction of offal, fish, or garbage. This invention also relates to certain properties of the composts prepared, and of the finished products.

The main object of this invention is to provide a simple, practicable, and economical method for converting perishable organic materials, such as those aforementioned, into relatively stable products suitable for use as fertilizer, more particularly when the supply of the materials available is insufficient to justify processing or drying by artificial heat. Further objects are: To convert the offal, tankage, or other refuse, into fertilizer material without important loss of plant-food constituents or potential fertilizer value, and without the materials undergoing the usual, intolerable putrefaction, or becoming offensive because of fly-breeding or the attracting of vermin; and to accomplish these results through simple admixture of the organic refuse with suitable quantities of compatible chemical agents and materials, followed in due course by a natural or spontaneous drying of the mixture. By "compatible chemical agents and materials" is here meant substances which, as ordinarily used, are themselves of value as soil amendments, or are not injurious to growing plants.

Advantages of our invention and its practical application are obvious from consideration of the following, for example. In the slaughtering of meat animals on the farm, and in small-scale commercial slaughtering operations, the quantities of blood and offal obtained are commonly too small to justify the undertaking of steam-rendering or other artificial reduction, and heat-drying; and disposal of the wastes is in many instances a serious problem. Often the refuse is buried deeply, a laborious method of disposal entailing total loss of the potential fertilizer value of the materials. Or, more commonly on the farm, the offal is fed raw, directly to hogs, a practice which in general is objectionable, since the offal from diseased animals, or those infested with parasites, becomes a menace to the health of the animals feeding thereon. Also, this practice often results in attracting rats and other vermin, and is conducive to the breeding of flies. For the same reason, such methods of disposal as shallow burying, or plowing into the soil are objectionable.

Other residues and wastes whose satisfactory disposal becomes a problem under certain circumstances, and which are adapted to manipulation by our process, are encountered in the fish and shell-fish industries.

We have discovered that by intimately mixing offal or blood with a sufficient quantity of an acid salt, in this case, monocalcium phosphate, to maintain the specific acidity of the mixture above a certain value, the mixture or compost is capable of spontaneous drying without rotting or the developing of fly larvæ; without important loss of fertilizing constituents (for example nitrogen or "ammonia"); and without serious deterioration of the fertilizing value of the phosphatic agent used as preservative.

Furthermore, the mono-calcium phosphate that we employ in various forms is a readily handled solid, in finely ground condition, and unlike more strongly acid substances that have been used for preserving perishable products it is not dangerously corrosive in the sense of making the manipulation hazardous to the operator. Nor, does mono-calcium phosphate violently attack clothing, wooden objects, etc., with which it comes in contact, as does strong sulphuric acid, for example.

We have found that if the mixtures, or composts prepared as described below are spread out in a well ventilated shed, or otherwise under cover, in layers not too thick to interfere with spontaneous air drying, the materials will readily become sufficiently dry to permit bagging and storing, and in the absence of excessive fat or grease, to allow grinding of the finished product.

We are aware that heretofore the use of some form of mono-calcium phosphate, for retaining the ammonia and as an aid in dehydrating such material as moist animal tankage, has been proposed as stated in U. S. Letters Patent No. 90,328. The process therein described pertains to the artificial, or heat-drying of such tankage, and has for its object the improvement of the cooked residues preparatory to such heat-drying. Preservation of the tankage or other material in the absence of artificial processing or drying, is not proposed therein.

We also are familiar with the prior use, in the art, of strong sulphuric acid for the purpose of preserving fish tankage, and in the preparation of the "acidulated fish scrap" of commerce, but because of its corrosive action, sulphuric acid is not suited as is mono-calcium phosphate to general use, as advocated herein. And, further, since the acidic effect produced by mono-calcium phosphate is so well buffered, by the very nature of the salt, it is adapted to employment in far greater concentrations in mixture with organic materials, and a more uniform and constant active acidity of the mixture is attained, than is the case with sulphuric acid.

As an example of the carrying out of our invention, its application to the treatment of raw animal offal will now be described. In processing such raw material we proceed substantially as follows:

A known weight of the offal is hashed, or ground to a state of sub-division commensurate with that produced by an ordinary sausage-chopper set for the coarsest chopping (e. g. using a plate with ½ inch to 1 inch holes). Such hashing may also be accomplished with a sharpened hoe. We then thoroughly mix the hashed offal with, ordinarily, not less than 10 per cent of its weight of mono-calcium phosphate, or not less than 35 per cent of its weight of commercial 16 per cent acid phosphate containing 16 per cent of available $P_2O_5$, or the equivalent in other grades of superphosphate to the end that a certain minimum active acidity is attained. We evaluate the active acidity in terms of the pH-value of an aqueous extract of the material; and our researches have revealed that such an extract, prepared from 1 part by weight of the mixture or compost to 20 parts of pure water, will manifest a hydrogen-ion concentration at least equivalent to a pH-value of 5.1. Attention is here called to the fact that pure mono-calcium phosphate with one mole of water of crystallization contains approximately 56 per cent of $P_2O_5$. Suitable grades of mono-calcium phosphate, containing 40 to 50 per cent of available $P_2O_5$, are now sold in the fertilizer market as double—or treble—superphosphate. Newly manufactured mono-calcium phosphate, of whatever grade, is preferable for our purpose since the acidity and solubility are then at a maximum.

We prefer to add to the mixture of offal and acid agent, sufficient ground gypsum, or dried peat, or other suitable non-basic (non-alkaline) material to absorb free water, and to impart to the mixture a non-fluid consistency, more particularly in case a concentrated grade of superphosphate is employed, or when the aforementioned minimum quantity of 35 per cent of acid phosphate is used, but the use of absorbing material is not absolutely essential to our process. On the other hand, we do not wish to be restricted to 10 per cent of mono-calcium phosphate, nor to 35 per cent of commercial acid phosphate, as the minimum proportion of the respective agent that can be used, since under unusually favorable climatic conditions less of either agent has sufficed.

After admixture, we prefer to spread the compost in layers to a depth of three or four inches in shallow bins, or on a suitable drying floor, and allow the material to undergo air drying in a ventilated shed. The drying is facilitated by stirring, or turning over the material occasionally. When air-dry, the material may be bagged for future use as fertilizer material.

Our experiments have shown that in treating raw materials such as offal under average summer conditions for the District of Columbia, where a temperature above 90° F. with high relative humidity is common, it is advisable to use more of the acid phosphatic agents than the respective minima prescribed above; for example, mono-calcium phosphate to the extent of 15 per cent, or acid phosphate to the extent of 50 per cent of the weight of raw offal, is more likely to prove satisfactory. When the minimal quantities of acid agent are employed for raw offal in hot weather, a sour-smelling fermentation may result, particularly in the absence of moisture-absorbing agents. This type of fermentation, however, differs from the putrefaction that untreated animal matter undergoes in that the compost becomes far less offensive. Further, the offal should be treated while perfectly fresh, since after putrefaction has started, the material may have more of a tendency to neutralize the acid preservative due to the formation of ammoniacal compounds, with the result that the offensive decomposition is not arrested.

The maintenance in the compost, of the aforementioned sufficiently high active acidity, we hold, also has an important bearing on the prevention of fly-breeding.

The minimal quantity of acid phosphate, i. e. 35 per cent of the weight of the organic material, has been found satisfactory even in hot weather, for treating practically sterile material, such as moist tankage directly after boiling or rendering. It is therefore apparent that moist tankage or tankage press-cake is especially suited to conversion into fertilizer material by the process hereing described. Also, by first boiling, or rendering such material as animal offal, and separating the fat, or grease, the fertilizer value of the final product is enhanced, since the presence of much fatty matter in a fertilizer is objectionable and the removal of the fat increases the concentration of the fertilizing constituents.

We have found that raw shed blood from the slaughtering of animals may be satisfactorily converted into air-dry fertilizer material by our process, provided the blood is treated while fresh, and therefore practically sterile.

Other features of our invention relate to certain properties of the composts prepared, and of the finished products. We have discovered that the mixtures or composts prepared as described, observing the precautions noted, will readily dry in the air without important loss of fertilizing constituents, to yield fertilizer materials in more concentrated form. Our researches have shown that the mono-calcium phosphate contained in the acid agent used, undergoes only comparatively slight deterioration for fertilizing purposes. For example, we have found that only between 6 and 12 per cent of the total $P_2O_5$ in the finished dried product is in the unavailable form (i. e. is insoluble in water, or in the ammonium citrate reagent in general use by fertilizer chemists). The mixtures, or composts, do not become putrid, as would the untreated organic matter; and they possess and retain a fairly definite specific acidity, as previously described, which we believe militates against fly-breeding. It has been our observation that the development of fly larvæ in the properly prepared composts has been prevented even in experiments where flies swarmed about the material and developed in unsuccessful mixtures alongside, and even where the eggs were deposited on the material. The composts or mixtures, prepared as described, appeared to have no attraction for rats and similar vermin.

What we claim is:

1. A process for preparing fertilizer material from perishable organic material, which process consists in intimately mixing the said organic material with an amount of an acid salt sufficient to develop in the mixture a degree of acidity sufficient to preserve the mixture, and storing the mixture under conditions permitting natural or spontaneous air drying.

2. A process for preparing fertilizer material from perishable organic material, which process consists in intimately mixing the organic material with a sufficient quantity of an acid salt to develop a high acid content in the mixture, adding a sufficient amount of a suitable non-basic absorbent agent to impart a non-fluid consistency to the mixture and drying the material in the air.

3. A process for preparing fertilizer material from perishable organic material, which process consists in intimately mixing the organic material with mono-calcium phosphate in an amount sufficient to develop in the mixture a degree of acidity sufficient to preserve the mixture, and storing the mixture under conditions that will permit it to dry in the air.

4. A process for preparing fertilizer material from perishable organic material, which process consists in intimately composting the organic material with a quantity of mono-calcium phosphate in an amount sufficient to develop a degree of acidity that will preserve the composting, adding finely divided calcium sulphate to impart a non-fluid consistency to the mixture, and drying the same in the air.

GEORGE P. WALTON.
ROBERT F. GARDINER.